United States Patent [19]
Beck et al.

[11] Patent Number: 4,686,263
[45] Date of Patent: Aug. 11, 1987

[54] MODIFIED EPDM RUBBERS, THE PRODUCTION THEREOF AND THE USE THEREOF FOR THE PRODUCTION OF IMPACT-RESISTANT VINYL POLYMERS

[75] Inventors: Manfred Beck, Wipperfuerth; Wolfgang Nentwig, Cologne, both of Fed. Rep. of Germany

[73] Assignee: Bayer Aktiengesellschaft, Leverkusen, Fed. Rep. of Germany

[21] Appl. No.: 757,724

[22] Filed: Jul. 22, 1985

[30] Foreign Application Priority Data

Aug. 2, 1984 [DE] Fed. Rep. of Germany ....... 3428496

[51] Int. Cl.$^4$ .................. C08L 9/06; C08L 51/04; C08L 53/02
[52] U.S. Cl. .................................... 525/245; 525/243; 525/247; 525/71; 525/75; 525/86; 525/289; 525/290; 525/313; 525/314; 525/315; 525/316
[58] Field of Search .................. 525/315, 314, 245

[56] References Cited

U.S. PATENT DOCUMENTS

| | | | |
|---|---|---|---|
| 3,445,543 | 5/1969 | Gruner | 525/98 |
| 3,494,983 | 2/1970 | Diem | 525/315 |
| 3,652,729 | 3/1972 | Brodoway | 525/315 |
| 3,953,542 | 4/1976 | Halasa et al. | 525/247 |
| 4,369,291 | 1/1983 | Arlt et al. | |
| 4,386,187 | 5/1983 | Grancio et al. | 525/96 |

FOREIGN PATENT DOCUMENTS

| | | |
|---|---|---|
| 20913 | 1/1981 | European Pat. Off. |
| 1106079 | 1/1957 | Fed. Rep. of Germany |
| 1540313 | 2/1967 | France |
| 1448105 | 4/1976 | France |

*Primary Examiner*—Carman J. Seccuro
*Attorney, Agent, or Firm*—Connolly and Hutz

[57] ABSTRACT

The production of impact-resistant polystyrene with EPDM simplifies the process and produces improved products if a modified ethylene/propylene rubber consisting of styrene/butadiene- or diene polymers, ethylene, optionally propylene and an unconjugated diene are used as the elastifying component.

The modified EPDM rubbers consisting of (a) from 20 to 90% by weight of ethylene units, (b) from 1 to 25% by weight of units of a butadiene/styrene copolymer containing a quantity of from 10 to 90% by weight of styrene, (c) from 0 to 10% by weight of units of an unconjugated diolefin and (d) $C_3$–$C_{18}$ α-monolefin units to make up the difference to 100% by weight, are a further subject of this invention.

2 Claims, No Drawings

MODIFIED EPDM RUBBERS, THE PRODUCTION THEREOF AND THE USE THEREOF FOR THE PRODUCTION OF IMPACT-RESISTANT VINYL POLYMERS

The production of impact-resistant polystyrene (HIPS) with ethylene/propylene/diene terpolymers (EPDM) is for various reasons more difficult than the production of HIPS with polybutadiene. Polybutadiene can easily be produced at the desired low viscosity and can easily be grafted and cross-linked owing to its high unsaturation. Types of EPDM with high unsaturated and simultaneously low viscosity which are suitable for the production of HIPS are substantially more difficult to produce. Such EPDM produce, dissolved in styrene, solutions having undesirably high viscosity. Furthermore, polystyrene with low notched impact strength are obtained owing to the poor graftability and cross-linkability.

It has been found that these disadvantages can be overcome if novel polymers are used as the impact-resistant modifiers for HIPS, which polymers are obtained by copolymerizing ethylene, optionally propylene and a diene component with styrene/butadiene copolymers or polybutadiene (EPSB or EPB). A further advantage of using these polymers resides in the fact that the fine structure of the impact-resistant polystyrenes produced from them and therefore also the properties thereof can be varied within a wide range, something that is only very imcompletely successful with conventional EPDM types.

Thus an object of this invention is a process for the production of impact-resistant plastics from vinyl polymers, such as polystyrene or styrene/acrylonitrile copolymers, by known processes wherein a modified ethylene/propylene rubber consisting of styrene/-butadiene or diene polymers, ethylene, optionally propylene and an unconjugated diene which is produced in particular by a solution polymerisation process using Ziegler catalysts, is used as the elastifying component.

This invention also relates to the aforementioned modified EPDM rubbers (EPSB) consisting of (a) from 20 to 90% by weight of ethylene units, (b) from 1 to 25% by weight of units of a butadiene/styrene copolymer containing from 10 to 90% by weight of styrene, (c) from 0 to 10% by weight of units of an unconjugated diolefin and (d) $C_3$–$C_{18}$-α-monoolefin units to make up the difference to 100% by weight, and the production thereof by solution polymerisation using a coordination catalyst system.

Finally, this invention also relates to impact-resistant plastics consisting of vinyl polymers which have been modified by a modified EPDM rubber consisting of styrene/butadiene- or diene polymers, ethylene, optionally propylene and an unconjugated diene.

It is possible, using the claimed process for the production of EPSB, to produce new types of modified EPDM rubber which contain, for example, predetermined polystyrene and polybutadiene sequences or statistically distributed butadiene/styrene chains. These are particularly suitable for the production of impact-resistant polystyrene, as the particle size of the elastomer phase can be adjusted within a wide range when these types of rubber are used, thereby producing products having improved mechanical characteristics. Furthermore, it is also possible to adjust the starting viscosity of the monomer/rubber solutions used for the production of impact-resistant plastics by up to 50% lower than with conventional EPDM rubbers and also to reduce the relative rise in viscosity on completion of phase inversion.

The use of EPDM rubbers modified only with polybutadiene (EPB) produces coarser particles in grafting with, for example, styrene, the inner structure of which particles differs from that of impact-resistant polystyrenes produced from conventional EPDM. It is also surprising that solutions of the EPDM rubbers which have been modified with polybutadiene rubber (EPB) and also EPSB in styrene have a higher viscosity before commencement of grafting than on completion of phase inversion. This is advantageous in a commercial process. The polystyrenes produced from these rubbers have better notched impact strength at low temperatures than EPDM.

The EPB rubbers contain analogous quantities of polybutadiene to that of styrene/butadiene copolymers in the case of EPSB. Catalyst systems of the Ziegler catalyst type, preferably soluble systems, most preferably catalysts with vanadium as a heavy metal component in combination with metal organic compounds, preferably aluminum organic compounds, such as aluminum trialkyls, dialkyl aluminum halides, alkyl aluminum dihalides or alkyl aluminum sesquihalides are suitable as catalyst systems. These systems belong to the state of the art for the production of EPDM rubbers.

Styrene/butadiene copolymers of any composition are suitable for the production of EPSB rubbers. The following are examples thereof;

1. styrene/butadiene copolymers with statistical distribution,
2. styrene/butadiene block polymers
3. styrene/butadiene block polymers with statistical SB distribution in the transition region (tapered structure),
4. multi-block polymers, consisting of styrene/butadiene.

The molecular weight are from 1,000 to 1,000,000 preferably from 5,000 to 500,000, most preferably from 20,000 to 300,000. The quantity of vinyl contained in the butadiene component may be from 7 to 100%. The quantity of styrene contained in the copolymers is preferably from 20 to 60%.

Butadiene/styrene copolymers are known. Thus, it is understood by those skilled in the art that branched polymers obtained by coupling or other methods, and also those having terminal polystyrene or terminal polybutadiene blocks are included among these copolymers.

1,4-hexadiene, dicyclopentadiene, 5-ethylidene-2-norbornene are examples of unconjugated dienes suitable for synthesis.

Inert hydrocarbons, such as aliphatic, cycloaliphatic and aromatic materials are suitable as solvents. Hexane is preferred. The process can be carried out at a temperature of from −20° to 150° C., preferably from 20° to 80° C.

The resin according to the invention obtained from the aforementioned rubbers can be produced in that monomer(s) are polymerised in the presence of modified EPDM rubber of this invention. Polymerisation can be carried out by any known continuous or discontinuous mass or mass/suspension process. These processes belong to the state of art. Examples thereof are described in EP No. 86128 or DE-OS No. 31 12935. The styrene resin composition according to the invention contains a graft polymer consisting of the aforementioned EPDM which has been modified using S/B copolymers or polybutadiene, the quantity of rubber being from 2 to 25%, based on the composition. A two-stage process in which the rubber solution in styrene is converted in the first stage at a temperature of from 80° to 120° C. to produce a prepolymer, is particularly suitable for producing the styrene resins.

It is then suspended in water and polymerised to completion. Known organic peroxides or azo catalysts can be used as initiators for both stages. The following are examples thereof: dicumylperoxide, benzoylperoxide, di-tert.-butylperoxide, tert.-butyl-perbenzoate, 2,2-dimethyl-2,5-bis(tert.-butylperoxy)-3-hexene or tert.-butyl-perhexanoate. The quantity of catalyst is from 0.01 to 2%, preferably from 0.04 to 1%, in each stage. Thermal polymerisation in the absence of catalyst is also possible. Known substances such as mercaptans or hydrocarbon halides can also be used in a quantity of from 0.05 to 0.5% as molecular weight regulators. The prepolymer solution is added to an aqueous solution containing suitable suspending agents, such as polyvinyl alcohol, hydroxymethylcellulose, polyvinyl pyrrolidone inter alia and organic suspending agents, for example from the series of phosphates, on completion of the first stage. Further suitable peroxides are also added in this stage.

Polymerisation in the second stage is carried out at a temperature of from 80° to 170° C., preferably from 120° to 150° C.

The styrene resins according to the invention can contain additives, such as anti-oxidants and UV-absorbers, substances for improving flame-resistance or fillers.

| Abreviations | Glossary of abreviations used | |
|---|---|---|
| | Definition | measured in |
| L-value | solution viscosity of a 5% solution in toluene at 25° C. | ml/g |
| $C_3$ | Propylene content from the IR-spectrum | % |
| MFI | Melt index at 200° C./5 kg load (DIN 53 735) | g/10 min |
| $H_C$ | Indentation hardness | N/mm$^2$ |

| Abreviations | Glossary of abreviations used | |
|---|---|---|
| | Definition | measured in |
| Vicat B | (DIN 53 456) ASTM (DIN 53 460) | °C. |
| $a_K$ | Notched impact strength (DIN 53 453) | KJ/m$^2$ |
| RF | Tensile strength (DIN 53 455) | MPa |
| D | Elongation (DIN 53 455) | % |
| Gel | Insoluble in methyl ethyl ketone/acetone (50:50) at 25° C. | % by weight |

EXAMPLES

Styrene/butadiene copolymers

The following S/B copolymers produced by known processes are used:

TABLE 1

| | % by weight of styrene | Molecular weight | | Block-styrene | L-value[1] | 1,2-content[2] | Observations |
|---|---|---|---|---|---|---|---|
| | | Butadiene block | Styrene block | | | | |
| A | 50 | 20,000 | 20,000 | 50.0 | 59.8 | 45 | diblockpolymer-production by separate addition |
| B | 50 | 20,000 | 20,000 | 49.8 | 54.3 | 43 | diblockpolymer-production by separate addition |
| C | 50 | 80,000 | 80,000 | 50.9 | 194.0 | 45 | diblockpolymer-production by separate addition |
| D | 50 | 80,000 | 80,000 | 47.7 | 342.0 | 45 | diblockpolymer-production by separate addition |
| E | 40 | — | — | 31.4 | 310 | 10 | addition together[3] |
| F | 18 | — | — | 0 | 310 | 10 | statistical SBR[4] |

[1] $\eta$ spec. /C in toluene, 5%
[2] based on butadiene proportion
[3] Block polymer with a transition block, total styrene 40%
[4] Statistical SBR having 18% styrene; ML4' (100°) = 45

EXAMPLES 1 TO 7

Ethylene/propylene-diene polymers

The following quantities of the following substances are metered in hourly at 60° C. to a 2 l reactor (unless otherwise indicated, c.f. Table 2):

2.7 l of n-hexane,
50 g of ethylene,
370 g of propylene,
2 g of ethylidene norbornene (EN),
0.767 g of ethylaluminum sesquichloride (EASC),
0.03 g of $VOCl_3$,
0.43 g of butylperchloro crotonate (BPCC).

The catalyst components are dissolved separately in some hexane; EN and the styrene/butadiene copolymer given in Table 1 or the polybutadiene are dissolved in the residual quantity of hexane.

The reaction is carried out while maintaining the content of the reactor constant, that is to say the same quantities are removed as are added hourly. The mixture removed from the reactor is stopped with 100 ml/h of water, then 0.2 g/h of 3-(4-hydroxy-3,5-di-tert.-butyl-phenyl)-propionic acid octadecylester are added as stabilizer and the polymer is isolated by precipitation with ethanol. After drying (14 hours, 70° C.) the samples are examined (Table 2).

TABLE 2

| | Analytical characteristics of the E/P polymers | | | | | | |
|---|---|---|---|---|---|---|---|
| Example | S/B polymer Type[1] | g/h | Iodine number | $C_3$ % | L-value | Polymer g/h | Viscosity[3] in styrene (5%) (m Pa sec) | Observations |
| 1 | D | 12 | 19.4 | 52.6 | 171 | 100 | 65 | |

TABLE 2-continued

| | | | Analytical characteristics of the E/P polymers | | | | |
|---|---|---|---|---|---|---|---|
| | S/B polymer | | Iodine | $C_3$ | L- | Polymer | Viscosity[3] in styrene (5%) | |
| Example | Type[1] | g/h | number | % | value | g/h | (m Pa sec) | Observations |
| 2 | A | 12 | 21.7 | 52.6 | 140 | 91 | 40 | |
| 3 | A | 12 | 23.7 | 53.5 | 135 | 99 | 38 | |
| 4 | B | 18 | 15.6 | 53.6 | 142 | 100 | 45 | |
| 5 | E[2] | 6 | 13.2 | 37.0 | 236 | 166 | | 160 g/h of ethylene 4 g/h of EN |
| 6 | F | 15 | 25.7 | 46.6 | 235 | 170 | 45 | 160 g/h of ethylene 4 g/h of EN, Temp. 45° C. |
| 7 | C | 18 | 29.7 | 54.0 | 180 | 106 | 70 | |

[1]c.f. Table 1;
[2]ML-4' (100°) = 66, Defo-E = 4.4, Defo-H = 9;
[3]Measured using a rotating viscometer Examples 1A to 6A (impact-resistant polystyrene containing the rubbers from Examples 1 to 6)

Stage 1

150 g of modified EPDM or an unmodified EPDM for comparison containing 45% by weight propylene and 8 double bonds per 1000 carbon atoms, and an L-value of 184 are dissolved in 1350 g of styrene in a 3 l vessel. 31.5 g of white oil, 1.6 g of Trigonox B and 3.95 ml of a tert. dodecyl-mercaptan solution (10 g of t.-DDM in 100 ml solution) are added. The mixture is heated under nitrogen to 105° C. and this temperature is held constant for 3 hours.

Stage 2

The mixture is allowed to cool under nitrogen and the polystyrene solution is filled under nitrogen into an autoclave which has been charged with 1250 g of an aqueous solution of a dispersing agent (5 g of polyvinyl pyrrolidone and 1 g of $Na_2P_2O_7$ per 1000 ml of water). 5.74 g of Trigonox B are then added. The following temperature programme is carried out under stirring (650 rpm): 1 hour at 120° C., 2 hours at 140° C. and 3 hours at 150° C. After cooling, the polymer beads are filtered off, washed and dried under vacuum. Standard small rods of the material are produced on a injection moulding machine and their mechanical standard values are measured (DIN 53 453). The results are given in Table 3. The products have better notched impact strengths particularly at lower temperatures, than in the case of the comparative test.

Example 4A is produced by a modified formulation: Stage 1 uses 0.71 g of dicumylperoxide, 13.5 ml of tert. dodecylmercaptan solution, 1.8 g of 3-(4-hydroxy-3,5-di-tert.-butyl-phenyl)-propionic acid octadecylester. Stage 2: 1.2 g of dicumylperoxide are used instead of Trigonox B. Temperature programme: 5 hours at 120° C. and 7 hours at 140° C.

TABLE 3

Properties of HIPS made from the rubbers of Examples 1 to 6 (Table 2)

| | | Stage 1 | | | | |
|---|---|---|---|---|---|---|
| Example | Rubber according to Example | viscosity[1] before | after | solids % by weight | rpm | diameter rubber phase (μm) |
| Comparison | EPDM | 2000 | 2900 | 23.8 | 240 | 8–14 |
| 1A | 1 | 1600 | 6800 | 24.4 | 240 | 1–15 |
| 2A | 2 | 1150 | 1850 | 22.8 | 240 | 1–2 |
| 3A | 3 | 1100 | 6200 | 23.0 | 60 | 1–3 |
| 4A | 4 | 850 | 2400 | 29.0 | 240 | 1–3 |
| 5A | 5 | 9200 | 4600 | 26.0 | 240 | 1–13 |
| 6A | 6 | 10900 | 3000 | 22.5 | 240 | 1–20 |

| | Stage 2 | MFI | | Vicat | $a_K$ (KJ/m$^2$) | | RF | D |
|---|---|---|---|---|---|---|---|---|
| Example | % by weight Gel | 200/5 | $H_c$ | B | RT | −20° C. | MPa | % |
| Comparison | 28.5 | 19.2 | 57 | 82 | 3.8 | 2.2 | 20.1 | 34.0 |
| 1A | 27.2 | 10.6 | 62 | 83 | 4.3 | 2.7 | 20.8 | 22.8 |
| 2A | 29.5 | 18.2 | 65 | 83 | 3.7 | 2.7 | 21.3 | 28.6 |
| 3A | 33.4 | 12.8 | 59 | 84 | 3.9 | 2.8 | 20.6 | 44.0 |
| 4A | 38.7 | 2.9 | 103 | 91 | 5.5 | 2.6 | 45.7 | 4.4 |
| 5A | 31.6 | 7.8 | 46 | 86 | 4.6 | 4.6₁ | 21.0 | 44.0 |

[1]measured with a rotating viscometer at 25° C.
₁$a_K$ at −40° C.: 3.4 KJ/m$^2$ Examples 8–9 and 8A–9A (impact resistant polystyrene containing E/P-grafted polybutadiene).

1. Graft base for E/P grafting

An anionically produced polybutadiene oil having the following analytical characteristics is used as graft base to produce the E/P rubber: molecular weight 1400 (osmometer), iodine number 405, L-value 10.9, vinyl content 45.6% by weight.

2. Production of the polybutadiene-based E/P rubber

E/P graft polymers are produced analogously to Examples 1 to 6. 4 g/h of the aforementioned polybutadiene oil are used instead of the styrene/butadiene copolymer. Differing from the above formulation 100 g of ethylene are used per hour. Further, the rubber according to Example 9 is produced without addition of EN (Table 4).

TABLE 4

| Example | EN g/h | Iodine number | $C_3$% L-value | Yield g/h | Viscosity 5% in styrene | ML4' (100°) |
|---|---|---|---|---|---|---|
| 8 | 2 | 5.5 | 49.0 | 197 | 136 | n.b. | 48 |
| 9 | — | 3.9 | 48.5 | 193 | 162 | 100 | 41 |

3. Impact-resistant polystyrene containing the rubbers of Examples 8 and 9

Impact resistant polystyrene is produced according to Examples 1A to 6A using rubbers 8 and 9. The observation that the viscosity of the solution is lower on completion of stage 1 of the process than at the beginning is particularly surprising. The E/P grafted polybutadienes partially provide larger particles and the particle size distribution of the rubber phase is very wide. The notched impact strength at −20° is improved (Table 5).

TABLE 5

| | | Stage 1 | | | | |
|---|---|---|---|---|---|---|
| Example | Rubber | Viscosity before | (m Pa sec) after | Solids | rpm | Diameter rubber phase |
| Comparison | EPDM | 2000 | 2900 | 23.8 | 240 | 8–14 |
| 8A | 8 | 2500 | 2100 | 22.0 | 240 | 4–18 |
| 9A | 9 | 2500 | 1600 | 19.2 | 240 | 3–23 |

| | Stage 1 | | | | | | | |
|---|---|---|---|---|---|---|---|---|
| | Gel (%) | 200/5 | $H_c$ | Vicat | RT | C. | (MPa) | (%) |
| Comparison | 28.5 | 19.2 | 57 | 82 | 3.8 | 2.2 | 20.1 | 34 |
| 8A | 27.9 | 11.0 | 53 | 85 | 3.9 | 3.3 | 18.0 | 23 |
| 9A | 27.8 | 12.0 | 57 | 82 | 4.0 | 3.1 | 20.7 | 49 |

(Stage 2: MFI  $a_k$  −20°  RF  D)

I claim:

1. Modified EPDM rubbers containing copolymerized units (a) through (d) wherein (a) through (d) are as follows:
   (a) from 20 to 90% by weight of ethylene units,
   (b) from 1 to 25% by weight of units of a butadiene/styrene block copolymer containing a quantity of styrene of from 10 to 90% by weight,
   (c) from 0 to 10% by weight of units of an unconjugated diolefin and
   (d) a sufficient amount of $C_3$–$C_{18}$ α-monoolefin units to make the sum of (a), (b), (c) and (d) 100% by weight.

2. A process for the production of the modified EPDM rubbers which comprises polymerizing ethylene, an unconjugated diolefin, and an alpha-olefin having 3 to 18 carbon atoms in the presence of a butadiene/styrene block copolymer containing 10 to 90% by weight styrene dissolved in an inert solvent, in the presence of a Ziegler catalyst at −20° to 150° C., wherein the amount of butadiene/styrene block copolymer is 1 to 25% by weight, ethylene is 20 to 90% by weight, unconjugated diolefin is 0 to 10% by weight and the amount of alpha-olefin is sufficient to bring the sum of reactants to 100% by weight.

* * * * *

UNITED STATES PATENT AND TRADEMARK OFFICE
CERTIFICATE OF CORRECTION

PATENT NO. : 4,686,263
DATED : August 11, 1987
INVENTOR(S) : BECK ET AL

It is certified that error appears in the above-identified patent and that said Letters Patent is hereby corrected as shown below:

Please delete Table 5 in Cols. 7 & 8 and insert therefore:

Table 5

| Example | Rubber | Viscosity before (m Pa sec) | after | Solids | rpm | Diameter rubber phase |
|---|---|---|---|---|---|---|
| Comparison | EPDM | 2000 | 2900 | 23.8 | 240 | 8 - 14 |
| 8A | 8 | 2500 | 2100 | 22.0 | 240 | 4 - 18 |
| 9A | 9 | 2500 | 1600 | 19.2 | 240 | 3 - 23 |

Table 5 (Continuation)

| | Stage 2 Gel (%) | MFI 200/5 | $H_C$ | Vicat RT | $a_k$ -20°C | RF (MPa) | D (%) |
|---|---|---|---|---|---|---|---|

UNITED STATES PATENT AND TRADEMARK OFFICE
CERTIFICATE OF CORRECTION

PATENT NO. : 4,686,263

DATED : August 11, 1987

INVENTOR(S) : Beck, et al.

It is certified that error appears in the above-identified patent and that said Letters Patent is hereby corrected as shown below:

| | | | | | | | | |
|---|---|---|---|---|---|---|---|---|
| Comparison | 28.5 | 19.2 | 57 | 82 | 3.8 | 2.2 | 20.1 | 34 |
| 8A | 27.9 | 11.0 | 53 | 85 | 3.9 | 3.3 | 18.0 | 23 |
| 9A | 27.8 | 12.0 | 57 | 82 | 4.0 | 3.1 | 20.7 | 49 |

Signed and Sealed this

Eighth Day of May, 1990

Attest:

HARRY F. MANBECK, JR.

*Attesting Officer*   *Commissioner of Patents and Trademarks*